(12) United States Patent
Todo

(10) Patent No.: US 12,202,976 B2
(45) Date of Patent: Jan. 21, 2025

(54) THERMALLY CONDUCTIVE SILICONE GEL COMPOSITION, THERMALLY CONDUCTIVE SILICONE SHEET, AND PRODUCTION METHOD THEREOF

(71) Applicant: Fuji Polymer Industries Co., Ltd., Nagoya (JP)

(72) Inventor: Shingo Todo, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 647 days.

(21) Appl. No.: 17/596,361

(22) PCT Filed: Mar. 26, 2021

(86) PCT No.: PCT/JP2021/012856
§ 371 (c)(1),
(2) Date: Dec. 8, 2021

(87) PCT Pub. No.: WO2022/049815
PCT Pub. Date: Mar. 10, 2022

(65) Prior Publication Data
US 2022/0306862 A1 Sep. 29, 2022

(30) Foreign Application Priority Data
Sep. 3, 2020 (JP) .................. 2020-147982

(51) Int. Cl.
*C08L 83/04* (2006.01)
(52) U.S. Cl.
CPC .................... *C08L 83/04* (2013.01)
(58) Field of Classification Search
CPC ...................................... C08L 83/04
USPC ........................................... 523/206
See application file for complete search history.

(56) References Cited

U.S. PATENT DOCUMENTS

| 2003/0207980 A1 | 11/2003 | Onishi et al. |
| 2004/0259979 A1 | 12/2004 | Onishi et al. |
| 2010/0331471 A1 | 12/2010 | Yamamoto et al. |
| 2020/0239758 A1* | 7/2020 | Ota ................ C08K 5/5415 |

FOREIGN PATENT DOCUMENTS

| EP | 3 872 135 | 9/2021 | |
| JP | 2002-114867 | 4/2002 | |
| JP | 2009-184866 | 8/2009 | |
| JP | 2010-155870 | 7/2010 | |
| JP | 2011-089079 | 5/2011 | |
| JP | 5304588 B | 10/2013 | |
| JP | 2020-002236 | 1/2020 | |
| JP | 2020-066713 | 4/2020 | |
| JP | 2020-077777 | 5/2020 | |
| TW | 201428057 | 7/2014 | |
| WO | WO-2019021824 A1 * | 1/2019 | ............. C08G 77/12 |

OTHER PUBLICATIONS

Extended European Search Report issued in corresponding Europea Patent Application No. 21820076.4, Sep. 23, 2022, 6 pages.
International Search Report issued in International Application No. PCT/JP2021/012856, May 11, 2021, 3 pages.
Office Action issued in corresponding Japanese Patent Application No. 2021-537930, Aug. 17, 2021, 4 pages w/translation.

* cited by examiner

*Primary Examiner* — Deve V Hall
(74) *Attorney, Agent, or Firm* — HSML P.C.

(57) ABSTRACT

A thermally conductive silicone gel composition contains: (A) an organopolysiloxane having two or more alkenyl groups per molecule; (B) an organohydrogenpolysiloxane having two or more hydrogen atoms bonded directly to silicon atoms; (C) a platinum group metal-containing curing catalyst in a catalytic amount; and (D) aluminum hydroxide particles as thermally conductive particles in an amount of 200 to 600 parts by mass with respect to 100 parts by mass of a total amount of the components (A) to (C). The aluminum hydroxide particles contain, based on 100% by mass, aluminum hydroxide particles (D-1) having a median diameter (D50) of 30 μm or more in an amount of more than 40% by mass and less than 75% by mass; and aluminum hydroxide particles (D-2) having a median diameter (D50) of less than 30 μm in an amount of 25% by mass or more and 60% by mass or less. The thermally conductive silicone gel composition has a relative dielectric constant of 5.0 or less at a frequency of 1 MHz according to a mutual induction bridge method and has a Shore OO hardness of 5 to 60. The silicone gel composition of the present invention, which is composed of substances not classified as hazardous under GHS criteria, has high safety, flexibility, a low dielectric constant, and thermal conductivity.

14 Claims, 1 Drawing Sheet

THERMALLY CONDUCTIVE SILICONE GEL COMPOSITION, THERMALLY CONDUCTIVE SILICONE SHEET, AND PRODUCTION METHOD THEREOF

TECHNICAL FIELD

The present invention relates to a thermally conductive silicone gel composition that is suitable to be interposed between a heat generating member and a heat dissipating material of electrical and electronic components or the like. More preferably, the present invention relates to a thermally conductive silicone gel composition and a thermally conductive silicone sheet having a low dielectric constant, and a production method for the same.

BACKGROUND ART

With the significant improvement in performance of semiconductors such as CPUs in recent years, the amount of heat generated by them has become extremely large. For this reason, heat dissipating materials are attached to electronic components that may generate heat, and a thermally conductive silicone gel is used between heat generating members such as semiconductors and the heat dissipating materials. The thermally conductive silicone gel is required to have thermal conductive properties, electromagnetic wave absorbing properties, and noise prevention properties as devices become smaller in size, more sophisticated, and more highly integrated. At the same time, to address global environmental issues, substances to be used need to comply with the Globally Harmonized System of Classification and Labelling of Chemicals (hereinafter, also referred to as "GHS"), which specifies criteria for classifying hazardous substances and labelling methods therefor (e.g., safety data sheets). Alumina, crystalline silica, and magnesium oxide, which are thermally conductive fillers, are classified as hazardous under GHS criteria and are not preferred. Patent Document 1 proposes adding crystalline silica particles and aluminum hydroxide particles to acrylic resin to form a low dielectric constant sheet. Patent Documents 2 to 4 propose adding alumina particles and plural kinds of aluminum hydroxide particles to organopolysiloxane to prepare a thermally conductive silicone composition.

PRIOR ART DOCUMENTS

Patent Documents

Patent Document 1: JP 2020-077777A
Patent Document 2: JP 5304588 B2
Patent Document 3: JP 2020-002236A
Patent Document 4: JP 2020-066713A

DISCLOSURE OF INVENTION

Problem to be Solved by the Invention

Crystalline silica contained in a composition of Patent Document 1 is classified as hazardous under GHS criteria. Alumina contained in the compositions of Patent Documents 2 to 4 is classified as hazardous under GHS criteria, and these documents are silent as to making low dielectric constant sheets.

To solve the above conventional problems, the present invention provides a thermally conductive silicone gel composition and a thermally conductive silicone sheet having a low dielectric constant that are composed of substances not classified as hazardous under GHS criteria and thus highly safe while having flexibility, and a production method for the same.

Means for Solving Problem

A thermally conductive silicone gel composition of the present invention contains:
(A) an organopolysiloxane having two or more alkenyl groups per molecule;
(B) an organohydrogenpolysiloxane having two or more hydrogen atoms bonded directly to silicon atoms;
(C) a platinum group metal-containing curing catalyst in a catalytic amount; and
(D) aluminum hydroxide particles as thermally conductive partides in an amount of 200 to 600 parts by mass with respect to 100 parts by mass of a total amount of the components (A) to (C), the aluminum hydroxide particles containing, based on 100% by mass of the aluminum hydroxide particles, aluminum hydroxide particles (D-1) having a median diameter (D-50) of 30 μm or more in an amount of more than 40% by mass and less than 75% by mass; and aluminum hydroxide particles (D-2) having a median diameter (D50) of less than 30 μm in an amount of 25% by mass or more and 60% by mass or less,
wherein the thermally conductive silicone gel composition has a relative dielectric constant of 5.0 or less at a frequency of 1 MHz according to a mutual induction bridge method of JIS K 6911:2006 and has a Shore OO hardness of 5 to 60.

A thermally conductive silicone sheet of the present invention is a sheet of the thermally conductive silicone gel composition.

A method for producing the thermally conductive silicone sheet of the present invention includes: mixing the following components; sheeting the mixture; and curing the sheet, the components of the mixture comprising:
(A) an organopolysiloxane having two or more alkenyl groups per molecule;
(B) an organohydrogenpolysiloxane having two or more hydrogen atoms bonded directly to silicon atoms;
(C) a platinum group metal-containing curing catalyst in a catalytic amount; and
(D) aluminum hydroxide particles as thermally conductive particles in an amount of 200 to 600 parts by mass with respect to 100 parts by mass of a total amount of the components (A) to (C), the aluminum hydroxide particles containing, based on 100% by mass of the aluminum hydroxide particles, aluminum hydroxide particles (D-1) having a median diameter (D50) of 30 μm or more in an amount of more than 40% by mass and less than 75% by mass;
and aluminum hydroxide particles (D-2) having a median diameter (D50) of less than 30 μm in an amount of 25% by mass or more and 60% by mass or less,
wherein the thermally conductive silicone sheet has a relative dielectric constant of 5.0 or less at a frequency of 1 MHz according to a mutual induction bridge method of JIS K 6911:2006 and has a Shore OO hardness of 5 to 60.

Effect of the Invention

The thermally conductive silicone gel composition and the thermally conductive silicone sheet of the present invention have high safety, flexibility, and a low dielectric constant by containing the components (A) to (D) that are not classified as hazardous under GHS criteria and satisfying a relative dielectric constant of 5.0 or less at a frequency of 1 MHz according to the mutual induction bridge method of JIS K 6911:2006 and a Shore OO hardness of 5 to 60. The present invention further provides the production method for the same.

DESCRIPTION OF THE INVENTION

Figure 1A:
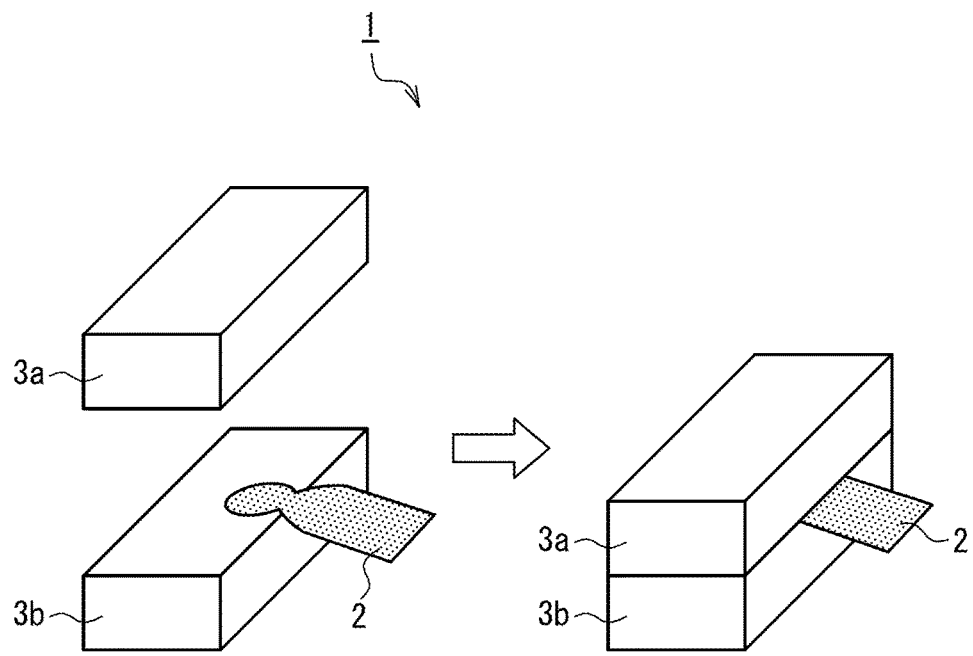
FIGS. 1A and 1B are diagrams illustrating a method for measuring the thermal conductivity of a sample in an example of the present invention.

The component (A) of the present invention is an organopolysiloxane having two or more alkenyl groups per molecule. The component (A) is a base polymer component of the silicone gel composition. Preferably, the organopolysiloxane has two or more alkenyl groups per molecule, and the viscosity is 100 to 10000 Pa·s. The viscosity is measured with a B-type rotational viscometer at 23° C. at a rotational speed of 20 rpm 30 seconds after start of rotation of a spindle.

The component (B) of the present invention is an organohydrogenpolysiloxane having two or more hydrogen atoms bonded directly to silicon atoms. The component (B) is a crosslinker component of the silicone gel composition. The number of moles of the hydrogen atoms bonded directly to silicon atoms is preferably 0.1 to 5.0 times the number of moles of the alkenyl groups of the component (A). The number of moles is more preferably 0.1 to 4.0 times, and further preferably 0.1 to 3.0 times the number of moles of the alkenyl groups of the component (A).

The component (C) of the present invention is a platinum group metal-containing curing catalyst. The catalyst is an addition reaction curing catalyst. The content of the component (C) is not limited particularly as long as it is a catalytic amount, and the content is preferably 0.1 to 1000 ppm with respect to the componentA on a mass basis of the platinum group metal element.

The component (D) of the present invention is aluminum hydroxide particles as thermally conductive particles. The content of the component (D) is 200 to 600 parts by mass with respect to 100 parts by mass of a total amount of the components (A) to (C). The component (D) includes aluminum hydroxide partides with different median diameters (D50). The aluminum hydroxide particles contain, based on 100% by mass of a total amount of the component (D), aluminum hydroxide particles (D-1) having a median diameter (D50) of 30 μm or more in an amount of more than 40% by mass and less than 75% by mass; and aluminum hydroxide particles (D-2) having a median diameter (D50) of less than 30 μm in an amount of 25% by mass or more and 60% by mass or less. Preferably, the content of the component (D-1) is more than 45% by mass and less than 75% by mass, and the content of the component (D-2) is more than 25% by mass and less than 55% by mass. By using the aluminum hydroxide particles with different median diameters (D50), small-size particles fill the spaces between large-size particles, which can provide nearly the closest packing and improve the thermal conductivity. The particle diameter as used herein refers to D50 (median diameter) at 50% in a volume-based cumulative particle size distribution, which is determined by a parade size distribution measurement with a laser diffraction scattering method. The measuring device may be, e.g., a laser diffraction/scattering particle size distribution analyzer LA-950 S2 manufactured by HORIBA, Ltd.

The thermally conductive silicone gel composition of the present invention has a relative dielectric constant of 5.0 or less, and preferably 4.8 or less, at a frequency of 1 MHz according to the mutual induction bridge method of JIS K 6911:2006. This improves the electromagnetic wave absorbing properties and noise prevention properties of the thermally conductive silicone gel composition The lower limit of the relative dielectric constant is 2.6 or more, and preferably 3.0 or more.

The thermally conductive silicone gel composition of the present invention has a Shore OO hardness of 5 to 60, and preferably 10 to 55. Thus, the thermally conductive silicone gel composition can exhibit flexibility. The thermally conductive silicone gel composition having flexibility can enhance adhesion between a heat generating member such as a semiconductor and a heat dissipating material and is suitably used as a thermal interface material (TIM).

The thermally conductive silicone gel composition of the present invention may further contain a surface treatment agent for the thermally conductive particles, as a component (E). Examples of the surface treatment agent include a titanate coupling agent, an aluminate coupling agent, a stearate coupling agent, an epoxy silane coupling agent, and an alkyl silane coupling agent. Among these, the alkyl silane coupling agent is preferred, and specifically, the alkyl silane coupling agent preferably contains at least one selected from an alkoxysilane compound expressed by $R_aSi(OR')_{4-a}$ (where R represents a substituted or unsubstituted organic group having 6 to 12 carbon atoms, R' represents an alkyl group having 1 to 4 carbon atoms, and a is 0 or 1), a partial hydrolysate of the alkoxysilane compound, and an alkoxy group-containing silicone having a substituted or unsubstituted organic group having 6 to 12 carbon atoms. Examples of the silane compound include hexyltrimethoxysilane, hexyltriethoxysilane, octykrimethoxysilane, octyltriethoxysilane, decyltrimethoxysilane, decyltriethoxysilane, dodecyltrimethoxysilane, and dodecyltriethoxysilane. The silane compounds may be used individually or in combinations of two or more. The alkoxysilane and one-end silanol siloxane may be used together as the surface treatment agent. In this case, the surface treatment may include adsorption in addition to a covalent bond.

The surface treatment agent may be previously mixed with the thermally conductive particles in a pretreatment (i.e., a pretreatment method) or may be added when the matrix resin is mixed with the thermally conductive particles (i.e., an integral blend method). In these methods, the surface treatment agent is preferably added in an amount of 0.01 to 10 parts by mass with respect to 100 parts by mass of the thermally conductive particles. The surface treatment allows the thermally conductive particles to be easily blended with the matrix resin.

The thermally conductive silicone gel composition of the present invention may contain components other than the above as needed. For example, an addition reaction controlling agent such as 1-ethynyl-1-cyclohexanol, a heat resistance improver, a flame retardant, and a flame retardant auxiliary such as colcothar, titanium oxide, and cerium oxide may be added. Moreover, an organic or inorganic particle pigment may be added for the purpose of coloring and toning. Alkoxy group-containing silicone may be added as a material, e.g., for the surface treatment of a filler.

The thermally conductive silicone gel composition of the present invention may contain thermally conductive particles other than the component (D) that are not classified as hazardous under GHS criteria, as a component (F). For example, hexagonal boron nitride, aluminum nitride, amorphous silica, and calcium carbonate are preferably used. Alumina particles, crystalline silica particles, and magnesium oxide particles are classified as hazardous under GHS criteria and not preferred.

The thermal conductivity of the thermally conductive silicone gel composition is preferably 2.0 W/m·K or less, more preferably 0.5 to 2.0 W/m·K, and further preferably 0.7 to 1.8 W/m·K. Thus, it is possible to provide a silicone gel composition composed of substances not classified as hazardous under GHS criteria and thus being highly safe while having flexibility, a low dielectric constant, and well-balanced thermal conductivity.

The specific gravity of the thermally conductive silicone gel composition is preferably 2.2 or less, and more preferably 2.0 or less. This makes the thermally conductive silicone gel composition a lightweight thermal interface material (TIM). The lower limit of the specific gravity of the composition is preferably 1.2 or more, and more preferably 1.4 or more.

The thermally conductive silicone gel composition of the present invention is preferably in the form of a sheet, i.e., a thermally conductive silicone sheet. The sheet is suitable as a thermal interface material.

The method for producing the thermally conductive silicone sheet of the present invention includes: mixing the components (A), (B), (C), (D), and other components as needed; sheeting the mixture; and curing the sheet, wherein the thermally conductive silicone sheet has a relative dielectric constant of 5.0 or less at a frequency of 1 MHz according to the mutual induction bridge method of JIS K 6911:2006 and has a Shore OO hardness of 5 to 60.

The sheet is preferably produced by mixing the above material components, sandwiching the mixture between polyethylene terephthalate (PET) films, rolling the sandwiched mixture into a sheet, and curing the sheet at 80 to 120° C. for 5 to 40 minutes.

EXAMPLES

Hereinafter, the present invention will be described by way of examples. However, the present invention is not limited to the following examples. Various parameters were measured m the following manner.

<Thermal Conductivity>

Figure 1B:
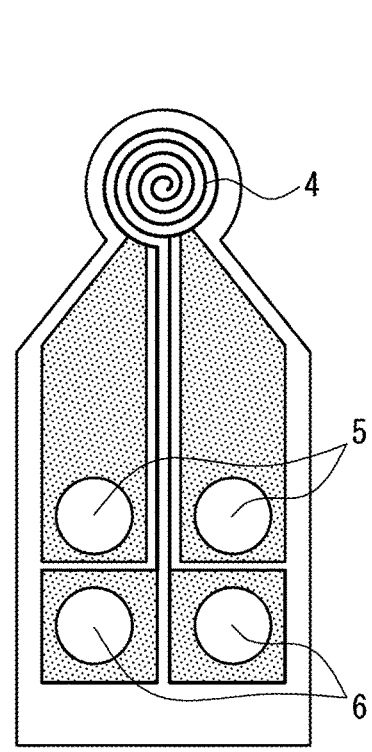

The thermal conductivity of a thermally conductive grease was measured by a hot disk (in accordance with ISO/CD 22007-2). As shown in FIG. 1A, in a thermal conductivity measuring apparatus 1, a polyimide film sensor 2 was sandwiched between two samples 3a, 3b, and constant power was applied to the sensor 2 to generate a certain amount of heat. Then, the thermal characteristics were analyzed from the value of a temperature rise of the sensor 2. The sensor 2 has a tip 4 with a diameter of 7 mm. As shown in FIG. 1B, the tip 4 has a double spiral structure of electrodes. An electrode 5 for an applied current and an electrode 6 for a resistance value (temperature measurement electrode) are located on the lower portion of the sensor 2. The thermal conductivity was calculated by the following formula (1).

$$\lambda = \frac{Po \cdot D(\tau)}{\pi^{3/2} \cdot r} \cdot \frac{D(\tau)}{\Delta T(\tau)} \quad \text{[Formula 1]}$$

$\lambda$: Thermal conductivity (W/m·K)
$P_0$: Constant power (W)
r: Radius of sensor (m)
$\tau$: $\sqrt{\alpha \cdot t / r^2}$
$\alpha$: Thermal diffusivity of sample (m²/s)
t: Measuring time (s)
$D(\tau)$: Dimensionless function of $\tau$
$\Delta T(\tau)$: Temperature rise of sensor (K)

<Relative Dielectric Constant>

The relative dielectric constant at a frequency of 1 MHz was measured according to the mutual induction bridge method of JIS K 6911:2006 using a 2-mm-thick sheet.

<Shore OO Hardness>

The Shore OO hardness was measured by an automatic durometer stand according to ASTM D2240 using a stack of four 3-mm-thick sheets.

Example 1

1. Material Components

As the components (A) to (C), a two-part room temperature curing silicone polymer was used. The two-part room temperature curing silicone polymer was composed of a solutionA containing the components (A) and (C) and a solution B containing the components (A) and (B).

Two-part room temperature curing silicone polymer: 100 parts by mass in total
Viscosity of solution A: 3000 mPa·s
Viscosity of solution B: 1000 mPa·s
Component (D):
(D-1) Aluminum hydroxide partides having a median diameter (D50) of 55 μm (Higilite H-10 manufactured by SHOWADENKO KK, not surface treated): 240 parts by weight
(D-2a) Aluminum hydroxide particles having a median diameter (D50) of 4 μm (CL-303 manufactured by Sumitomo Chemical Co., Ltd., surface treated with an epoxy silane coupling agent): 100 parts by weight 2. Mixing and Sheet Formation Thermally conductive silicone sheets were produced by mixing the above material components, sandwiching the mixture between PET films, rolling the sandwiched mixture into a sheet, and curing the sheet at 100° C. for 10 minutes. The thermally conductive silicone sheets were either 2 mm or 3 mm thick.

The thermally conductive silicone sheets thus obtained were evaluated. Table 1 summarizes the conditions and results.

Example 2

Thermally conductive silicone sheets of Example 2 were produced in the same manner as in Example 1 except for the following.

(D-1): 150 parts by mass (D-2b) Aluminum hydroxide particles having a median diameter (D50) of 10 μm (Higilite H-32 manufactured by SHOWADENKO KK, not surface treated): 100 parts by mass (F) Amorphous silica having a median diameter (D50) of 7 μm: 100 parts by mass Example 3

Thermally conductive silicone sheets of Example 3 were produced in the same manner as in Example 1 except for the following.

(D-1): 92 parts by mass
(D-2a): 118 parts by mass

Example 4

Thermally conductive silicone sheets of Example 4 were produced in the same manner as in Example 1 except for the following.

As the components (A) to (C), a two-part room temperature curing silicone polymer was used.

Two-part room temperature curing silicone polymer: 100 parts by mass in total
   Viscosity of solution A: 300 mPa·s
   Viscosity of solution B: 300 mPa·s (D-1): 250 parts by mass (D-2a): 130 parts by mass (D-2c) Aluminum hydroxide particles having a median diameter (D50) of 18 μm (trade name "Higilite H-31T" manufactured by SHOWADENKO KK, surface treated with a titanate coupling agent): 70 parts by mass (E) Decyltrimethoxysilane: 1 part by mass Table 1 summarizes the above conditions and results.

TABLE 1

| | | Example 1 | Example 2 | Example 3 | Example 4 |
|---|---|---|---|---|---|
| (A) + (B) + (C) mass (g) | | 100 | 100 | 100 | 100 |
| (D-1) mass (g) | | 240 | 150 | 92 | 250 |
| (D-2) total mass (g) | | 100 | 100 | 118 | 200 |
| (D-2a) | | 100 | — | 118 | 130 |
| (D-2b) | | — | 100 | — | — |
| (D-2c) | | — | — | — | 70 |
| (F) Amorphous silica, mass (g) | | — | 100 | — | — |
| Relative dielectric constant | 50 Hz | 5.0 | 4.6 | 4.3 | 5.4 |
| | 1 kHz | 4.4 | 4.1 | 3.8 | 4.8 |
| | 1 MHz | 4.2 | 3.9 | 3.7 | 4.6 |
| Hardness (Shore OO) | | 35 | 51 | 20 | 10 |
| Thermal conductivity (W/m·K), hot disk method | | 1.4 | 1.4 | 0.9 | 1.8 |
| Specific gravity | | 1.81 | 1.87 | 1.60 | 1.88 |
| GHS labelling | | No | No | No | No |

Comparative Examples 1 to 5

Thermally conductive silicone sheets of Comparative Examples 1 to 5 were produced in the same manner as in Example 1 except for those indicated in Table 2.

TABLE 2

| | | Comparative Example 1 | Comparative Example 2 | Comparative Example 3 | Comparative Example 4 | Comparative Example 5 |
|---|---|---|---|---|---|---|
| (A) + (B) + (C) mass (g) | | 100 | 100 | 100 | 100 | 100 |
| (D-1) mass (g) | | 350 | 0 | 0 | 240 | 0 |
| (D-2) total mass (g) | | 0 | 350 | 20 | 0 | 0 |
| (D-2a) | | — | 350 | — | — | — |
| (D-2b) | | — | — | 20 | — | — |
| (D-2c) | | — | — | — | — | — |
| Alumina particles, (D50) 70 μm, mass (g) | | 0 | 0 | — | 96 | — |
| Alumina particles, (D50) 35 μm, mass (g) | | — | — | 150 | — | 400 |
| Alumina particles, (D50) 3 μm, mass (g) | | — | — | 300 | 432 | 300 |
| Relative dielectric constant | 50 Hz | — | — | 5.7 | 6.1 | 6.0 |
| | 1 kHz | — | — | 5.6 | 5.7 | 5.9 |
| | 1 MHz | — | — | 5.6 | 5.5 | 5.8 |
| Hardness (Shore OO) | | — | — | 50 | 48 | 41 |
| Thermal conductivity (W/m·K), hot disk method | | — | — | 1.5 | 2.5 | 2.0 |
| Specific gravity | | — | — | 2.56 | 2.58 | 2.90 |
| GHS labelling | | — | — | Yes | Yes | Yes |

(Note: In Comparative Examples 1 and 2, the particles (D-1) and (D-2) could not be blended, and sheets could not be formed.)

The above results indicate that the silicone gel compositions of Examples 1 to 4 composed of substances not classified as hazardous under GHS criteria had high safety, flexibility, a low dielectric constant, and well-balanced thermal conductivity.

INDUSTRIAL APPLICABILITY

The thermally conductive silicone gel composition of the present invention is suitable to be interposed between a heat generating member and a heat dissipating material of electrical and electronic components or the like.

DESCRIPTION OF REFERENCE NUMERALS

1 Thermal conductivity measuring apparatus
2 Sensor
3a, 3b Sample
4 Tip of the sensor
5 Electrode for applied current
6 Electrode for resistance value (temperature measurement electrode)

The invention claimed is:

1. A thermally conductive silicone gel composition, comprising:
   (A) an organopolysiloxane having two or more alkenyl groups per molecule;
   (B) an organohydrogenpolysiloxane having two or more hydrogen atoms bonded directly to silicon atoms;
   (C) a platinum group metal-containing curing catalyst in a catalytic amount; and
   (D) aluminum hydroxide particles as thermally conductive particles in an amount of 200 to 600 parts by mass with respect to 100 parts by mass of a total amount of the components (A) to (C), the aluminum hydroxide particles comprising, based on 100% by mass of the aluminum hydroxide particles, aluminum hydroxide particles (D-1) having a median diameter (D50) of 30 μm or more in an amount of more than 40% by mass and less than 75% by mass; and aluminum hydroxide particles (D-2) having a median diameter (D50) of less than 30 μm in an amount of 25% by mass or more and 60% by mass or less,
   wherein the thermally conductive silicone gel composition has a relative dielectric constant of 5.0 or less at a frequency of 1 MHz according to a mutual induction bridge method of JIS K 6911:2006 and has a Shore OO hardness of 5 to 60.

2. The thermally conductive silicone gel composition according to claim 1, wherein the organopolysiloxane as the component (A) has a viscosity of 100 to 10000 Pa·s.

3. The thermally conductive silicone gel composition according to claim 1, wherein in the organohydrogenpolysiloxane as the component (B), the number of moles of the hydrogen atoms bonded directly to silicon atoms is 0.1 to 5.0 times the number of moles of the alkenyl groups of the component (A).

4. The thermally conductive silicone gel composition according to claim 1, further comprising a surface treatment agent for thermally conductive particles, as a component (E).

5. The thermally conductive silicone gel composition according to claim 4, wherein the surface treatment agent comprises at least one coupling agent selected from the group consisting of a titanate coupling agent, an aluminate coupling agent, a stearate coupling agent, an epoxy silane coupling agent, and an alkyl silane coupling agent.

6. The thermally conductive silicone gel composition according to claim 5, wherein the alkyl silane coupling agent comprises at least one selected from the group consisting of an alkoxysilane compound expressed by $R_aSi(OR')_{4-a}$ (where R represents a substituted or unsubstituted organic group having 6 to 12 carbon atoms, R' represents an alkyl group having 1 to 4 carbon atoms, and a is 0 or 1), a partial hydrolysate of the alkoxysilane compound, and an alkoxy group-containing silicone having a substituted or unsubstituted organic group having 6 to 12 carbon atoms.

7. The thermally conductive silicone gel composition according to claim 4, wherein the thermally conductive silicone gel composition comprises the surface treatment agent in an amount of 0.01 to 10 parts by mass with respect to 100 parts by mass of the thermally conductive particles.

8. The thermally conductive silicone gel composition according to claim 1, further comprising at least one thermally conductive particles selected from the group consisting of hexagonal boron nitride, aluminum nitride, amorphous silica, and calcium carbonate, as a component (F).

9. The thermally conductive silicone gel composition according to claim 1, wherein the thermally conductive silicone gel composition has a thermal conductivity of 2.0 W/m·K or less.

10. The thermally conductive silicone gel composition according to claim 1, wherein the thermally conductive silicone gel composition has a specific gravity of 2.2 or less.

11. A thermally conductive silicone sheet that is a sheet of a thermally conductive silicone gel composition,
   the thermally conductive silicone gel composition comprising:
   (A) an organopolysiloxane having two or more alkenyl groups per molecule;
   (B) an organohydrogenpolysiloxane having two or more hydrogen atoms bonded directly to silicon atoms;
   (C) a platinum group metal-containing curing catalyst in a catalytic amount; and
   (D) aluminum hydroxide particles as thermally conductive particles in an amount of 200 to 600 parts by mass with respect to 100 parts by mass of a total amount of the components (A) to (C), the aluminum hydroxide particles comprising, based on 100% by mass of the aluminum hydroxide particles, aluminum hydroxide particles (D-1) having a median diameter (D50) of 30 μm or more in an amount of more than 40% by mass and less than 75% by mass; and aluminum hydroxide particles (D-2) having a median diameter (D50) of less than 30 μm in an amount of 25% by mass or more and 60% by mass or less,
   wherein the thermally conductive silicone gel composition has a relative dielectric constant of 5.0 or less at a frequency of 1 MHz according to a mutual induction bridge method of JIS K 6911:2006 and has a Shore OO hardness of 5 to 60.

12. A method for producing a thermally conductive silicone sheet, comprising: mixing the following components; sheeting the mixture; and curing the sheet, the components of the mixture comprising:
   (A) an organopolysiloxane having two or more alkenyl groups per molecule;
   (B) an organohydrogenpolysiloxane having two or more hydrogen atoms bonded directly to silicon atoms;
   (C) a platinum group metal-containing curing catalyst in a catalytic amount; and (D) aluminum hydroxide particles as thermally conductive particles in an amount of 200 to 600 parts by mass with respect to 100 parts by mass of a total amount of the components (A) to (C), the aluminum hydroxide particles comprising, based on 100% by mass of the aluminum hydroxide particles, aluminum hydroxide particles (D-1) having a median diameter (D50) of 30 μm or more in an amount of more than 40% by mass and less than 75% by mass; and aluminum hydroxide particles (D-2) having a median diameter (D50) of less than 30 μm in an amount of 25% by mass or more and 60% by mass or less, wherein the thermally conductive silicone sheet has a relative dielectric constant of 5.0 or less at a frequency of 1 MHz according to a mutual induction bridge method of JIS K 6911:2006 and has a Shore OO hardness of 5 to 60.

13. The thermally conductive silicone gel composition according to claim 1, wherein the thermally conductive silicone gel composition is free from alumina particles, crystalline silica particles, and magnesium oxide particles.

14. The thermally conductive silicone sheet according to claim 11, wherein the thermally conductive silicone sheet is free from alumina particles, crystalline silica particles, and magnesium oxide particles.

* * * * *